US012607485B2

(12) United States Patent
Yamamoto et al.

(10) Patent No.: US 12,607,485 B2
(45) Date of Patent: Apr. 21, 2026

(54) MAGNETIC MARKER DETECTION METHOD AND DETECTION SYSTEM

(71) Applicant: Aichi Steel Corporation, Tokai (JP)

(72) Inventors: Michiharu Yamamoto, Tokai (JP); Tomohiko Nagao, Tokai (JP); Hitoshi Aoyama, Tokai (JP)

(73) Assignee: AICHI STEEL CORPORATION, Tokai (JP)

( * ) Notice: Subject to any disclaimer, the term of this patent is extended or adjusted under 35 U.S.C. 154(b) by 335 days.

(21) Appl. No.: 18/572,798

(22) PCT Filed: Jun. 21, 2022

(86) PCT No.: PCT/JP2022/024756
§ 371 (c)(1),
(2) Date: Dec. 21, 2023

(87) PCT Pub. No.: WO2022/270509
PCT Pub. Date: Dec. 29, 2022

(65) Prior Publication Data
US 2024/0288283 A1 Aug. 29, 2024

(30) Foreign Application Priority Data
Jun. 25, 2021 (JP) ................................. 2021-105652

(51) Int. Cl.
*G01D 5/14* (2006.01)
*G01C 21/26* (2006.01)
(52) U.S. Cl.
CPC ............. *G01D 5/14* (2013.01); *G01C 21/265* (2013.01)
(58) Field of Classification Search
CPC ................................. G01D 5/14; G01C 21/265
See application file for complete search history.

(56) References Cited

U.S. PATENT DOCUMENTS 5,189,612 A * 2/1993 Lemercier ............ G05D 1/0238
180/169
5,815,825 A * 9/1998 Tachibana ............ G05D 1/0293
318/587
(Continued)

FOREIGN PATENT DOCUMENTS

CN 109188315 A 1/2019
EP 3828659 A1 6/2021
(Continued)

OTHER PUBLICATIONS

International Search Report and Written Opinion mailed on Sep. 6, 2022, received for PCT Application PCT/JP2022/024756, filed on Jun. 21, 2022, 9 pages including English Translation.

*Primary Examiner* — Walter L Lindsay, Jr.
*Assistant Examiner* — Milton Gonzalez
(74) *Attorney, Agent, or Firm* — XSENSUS LLP

(57) ABSTRACT

Magnetic marker detection system for a vehicle including sensor array with magnetic sensors arrayed in a width direction to detect a magnetic marker laid in a traveling road includes differential circuit that obtains a difference between magnetic measurement values for each combination of two magnetic sensors spaced with a predetermined space, arithmetic circuit that performs process for detecting a position of the magnetic marker by processing the difference for the each combination, and setting circuit that selectively sets the predetermined space for obtaining the difference between magnetic measurement values; magnetic marker detection system can detect the magnetic marker laid in the traveling road with high certainty, irrespective of variations in attachment height of the magnetic sensors on a vehicle side.

20 Claims, 13 Drawing Sheets

(56) References Cited

U.S. PATENT DOCUMENTS

| | | | | |
|---|---|---|---|---|
| 5,938,707 A * | 8/1999 | Uehara | ................ | G05D 1/0261 |
| | | | | 701/41 |
| 5,957,983 A * | 9/1999 | Tominaga | ............ | G05D 1/0261 |
| | | | | 701/41 |
| 2015/0247719 A1 * | 9/2015 | Huang | ................ | B62D 15/025 |
| | | | | 701/41 |
| 2020/0320870 A1 | 10/2020 | Yamamoto et al. | | |
| 2021/0025959 A1 | 1/2021 | Yamamoto et al. | | |
| 2021/0271261 A1 | 9/2021 | Yamamoto et al. | | |
| 2022/0412769 A1 | 12/2022 | Yamamoto et al. | | |

FOREIGN PATENT DOCUMENTS

| | | | |
|---|---|---|---|
| JP | 2005-202478 A | 7/2005 |
| JP | 2017-108905 A | 6/2017 |
| JP | 2017-194353 A | 10/2017 |
| WO | 2019/198603 A1 | 10/2019 |
| WO | 2021/100866 A1 | 5/2021 |

* cited by examiner

MAGNETIC MARKER DETECTION METHOD AND DETECTION SYSTEM

CROSS-REFERENCE TO RELATED APPLICATIONS

The present application is based on PCT filing PCT/JP2022/024756, filed Jun. 21, 2022, which claims priority from Japanese Patent Application No. 2021-105652, filed Jun. 25, 2021, the entire contents of each are incorporated herein by reference.

TECHNICAL FIELD

The present invention relates to a detection method and a detection system for detecting a magnetic marker laid in a traveling road.

BACKGROUND ART

Conventionally, a vehicular system using magnetic markers laid in a road has been known (for example, refer to Patent Literature 1). This system has an object of providing various driving assists, such as automatic steering control and lane departure warning using magnetic markers, by taking a vehicle including magnetic sensors as a target.

CITATION LIST

Patent Literature

Patent: Literature 1: Japanese Unexamined Patent Application Publication No. 2005-202478

SUMMARY OF INVENTION

Technical Problem

However, the above-described conventional marker detection system has the following problem. That is, there is a problem of large variations in optimum specifications regarding process on magnetic measurement values by magnetic sensors because the attachment height of the magnetic sensor varies depending on the vehicle type.

The present invention was made in view of the above-described conventional problem, and is to provide a detection method and a detection system capable of detecting a magnetic marker laid in or on a traveling road with high reliability, irrespective of variations in attachment height of magnetic sensors on a vehicle side.

Solution to Problem

One mode of the present invention resides in a magnetic marker detection method for a vehicle including a sensor array with a plurality of magnetic sensors that obtain magnetic measurement values arrayed in a width direction to detect a magnetic marker laid in a traveling road, the magnetic marker detection method including:

a differential process of obtaining, based on a distribution of the magnetic measurement values of the plurality of magnetic sensors configuring the sensor array, for each combination of two positions spaced with a predetermined space, a difference between values configuring the distribution or values configuring a line representing the distribution;

an arithmetic process for detecting the magnetic marker or for detecting a position of the magnetic marker by taking the difference for the each combination obtained by the differential process as an input value; and a setting process of selectively setting the predetermined space for obtaining the difference.

One mode of the present invention resides in a magnetic marker detection system for a vehicle including a sensor array with a plurality of magnetic sensors that obtain magnetic measurement values arrayed in a width direction to detect a magnetic marker laid in a traveling road, the magnetic marker detection system including:

a differential circuit that obtains, based on a distribution of the magnetic measurement values of the plurality of magnetic sensors configuring the sensor array, for each combination of two positions spaced with a predetermined space, a difference between values configuring the distribution or values configuring a line representing the distribution;

an arithmetic circuit that performs an arithmetic process for detecting the magnetic marker or for detecting a position of the magnetic marker by taking the difference for the each combination obtained by the differential circuit as an input value; and a setting circuit that selectively sets the predetermined space for obtaining the difference.

Advantageous Effects of Invention

The present invention is an invention of the magnetic marker detection method or the magnetic marker detection system of detecting the magnetic marker by using the difference between magnetic measurement values of two magnetic sensors among magnetic sensors arrayed in the sensor array. The magnetic marker detection method and the magnetic marker detection system of the present invention has one technical feature in that a space between the two magnetic sensors for obtaining the difference is selectively selected.

If the attachment height of the sensor array varies, the magnitude of magnetism acting from the magnetic marker on the magnetic sensor varies. For example, if the attachment height of the sensor array is low, magnetism acting from the magnetic marker on the magnetic sensor increases. Among the plurality of magnetic sensors configuring the sensor array, a difference between a magnetic measurement value by a magnetic sensor positioned near the magnetic marker and a magnetic measurement value by a magnetic sensor positioned away from the magnetic marker also increases, as the attachment height of the sensor array is lower.

As in the present invention, if the process or the circuit of selectively setting the space between two magnetic sensors for obtaining the difference is provided, it is possible to suppress an influence due to the variance in attachment height of the sensor array. And, if the influence due to the variance in attachment height of the sensor array can be suppressed, it is possible to detect the magnetic marker by process with similar specifications, irrespective of the variance in attachment height of the sensor array. According to the process with similar specifications, it is possible to detect the magnetic marker with high certainty, irrespective of the variance in attachment height of the sensor array.

As described above, the magnetic marker detection method and the magnetic marker detection system of the present invention are detection method or detection system capable of detecting the magnetic marker by process with similar specifications, irrespective of variations in attachment height of a sensor array in a vehicle.

DESCRIPTION OF EMBODIMENTS

Embodiments of the present invention are specifically described by using the following embodiments.

First Embodiment

The present embodiment is an example regarding a detection method and detection system 1 for detecting magnetic marker 10 laid in a road. Details of this are described by using FIG. 1 to FIG. 10.

Figure 1:
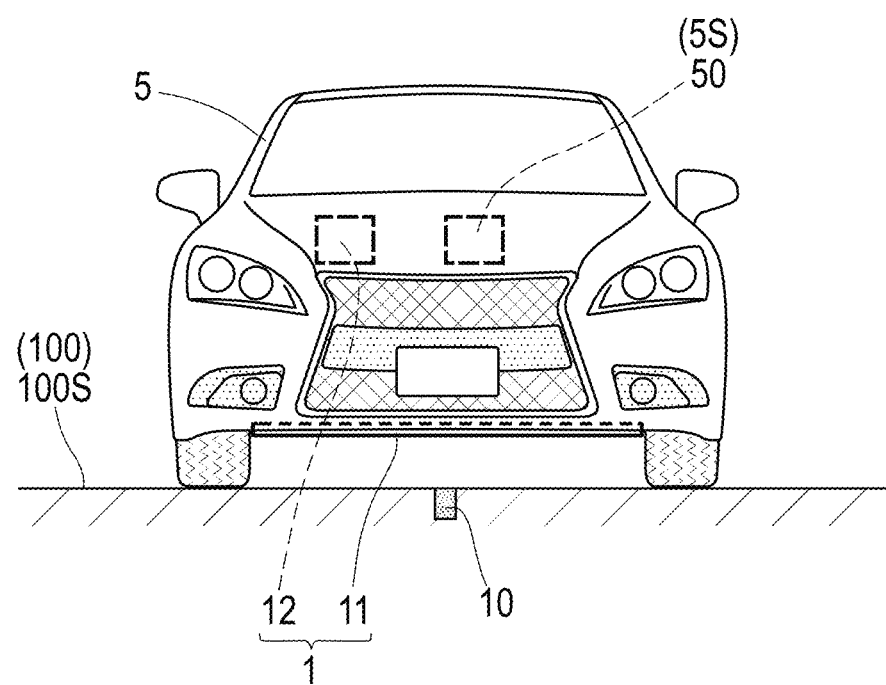
FIG. 1 is a front view of a vehicle having a magnetic marker detection system mounted thereon in a first embodiment.
Figure 2:
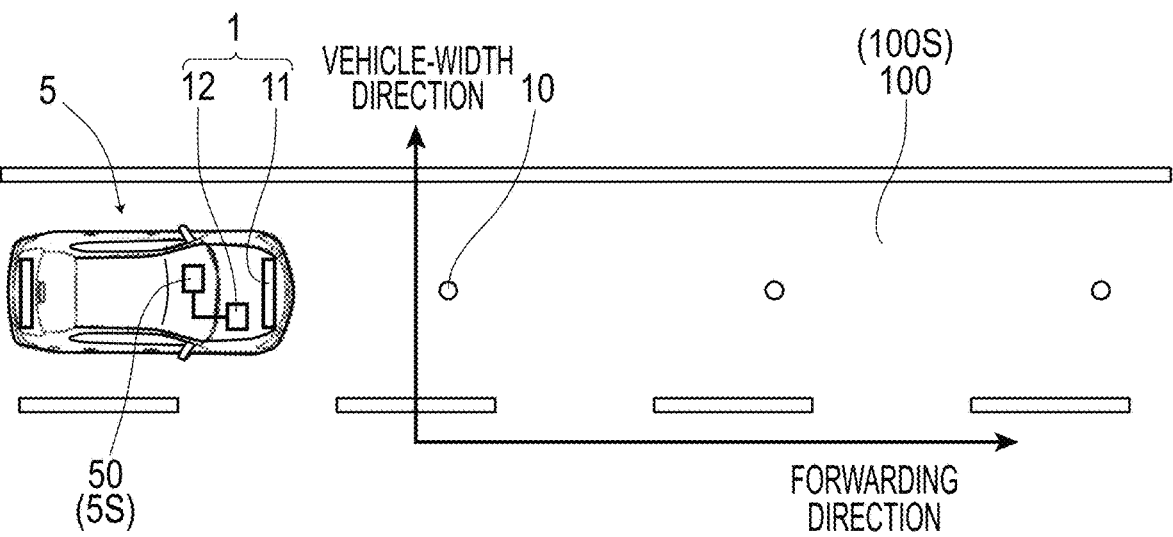
FIG. 2 is a descriptive diagram depicting the vehicle on a lane where magnetic markers are laid in the first embodiment.
Figure 3:
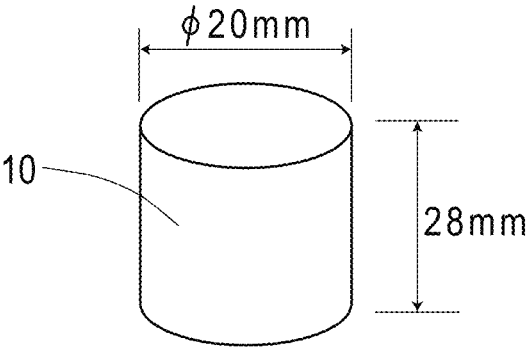
FIG. 3 is a perspective view of a magnetic marker in the first embodiment.

The present embodiment is an example in which, as in FIG. 1 and FIG. 2, detection system 1 for magnetic markers 10 is combined with driving assist system 5S allowing lane keeping traveling. Driving assist system 5S is configured to include vehicle ECU 50 that controls a steering actuator, not depicted, for steering wheels to be steered, a throttle actuator that adjusts engine outputs, and so forth. For example, vehicle ECU 50 controls vehicle 5 so that a lateral shift amount with respect to magnetic marker 10 is brought closer to zero, achieving lane keeping traveling.

Detection system 1 is a system that detects magnetic marker 10 by using sensor array 11 with magnetic sensors Cn arrayed on one straight line. This detection system 1 includes detection unit 12 that detects magnetic marker 10 by processing a magnetic measurement value of each magnetic sensor Cn. In the following, after magnetic marker 10 is generally described, sensor array 11 and detection unit 12 configuring detection system 1 are described.

(Magnetic Marker)

Magnetic marker 10 (FIG. 1 to FIG. 3) is a marker for roads laid at, for example, every 2 m, along the center of lane 100 forming a traveling road for vehicle 5. This magnetic marker 10 forms a columnar shape having a diameter of 20 mm and a height of 28 mm, and can be accommodated in a hole provided in road surface 100S. Magnetic marker 10 is a ferrite plastic magnet having magnetic powder of iron oxide as a magnetic material dispersed into a polymer material as a base material. Note that the entire or part of a surface of magnetic marker 10, which is a ferrite plastic magnet itself, may be provided with, for example, a resin mold layer.

The maximum energy product (BHmax) of the ferrite plastic magnet forming magnetic marker 10 is 6.4 KJ/m³. And, the magnetic flux density of the end face of magnetic marker 10 is 45 mT (milliteslas). Here, as vehicle 5 using magnetic marker 10, any of various vehicle types can be thought, such as a passenger vehicle or truck. The attachment height of magnetic sensor Cn (sensor array 11) depends on the ground clearance for each vehicle type, and can be assumed in a range of 90 mm to 250 mm. Magnetic marker 10 can act with magnetism having magnetic flux density of 8 μT at a position with a height of 250 mm, which corresponds to an upper limit of the range assumed as the attachment height of magnetic sensor Cn.

(Sensor Array)

Figure 4:
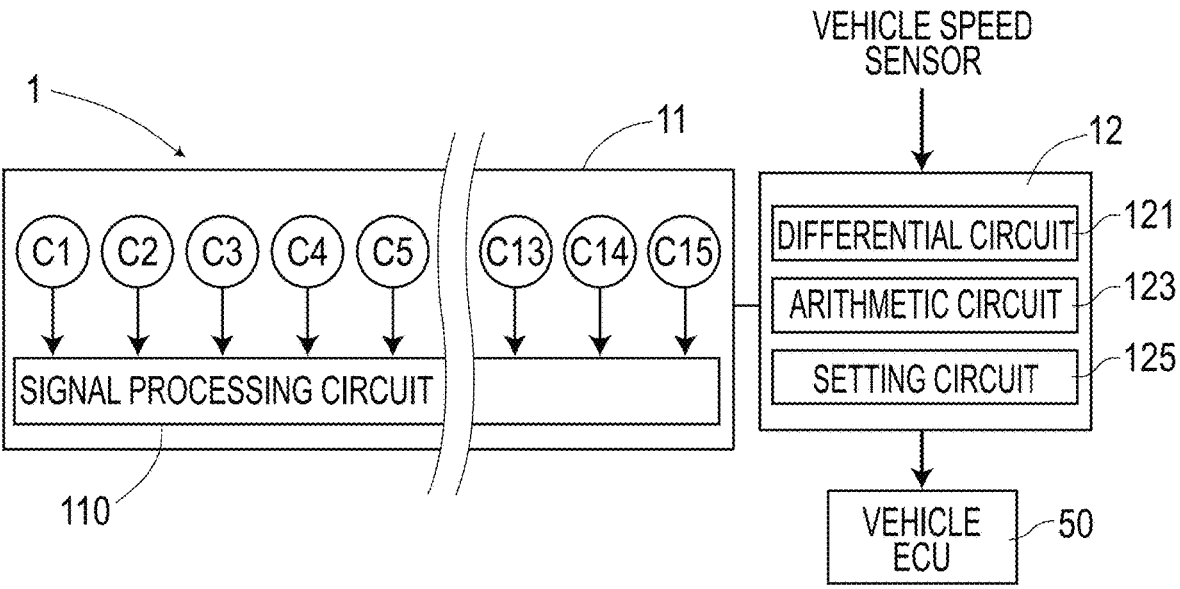
FIG. 4 is a block diagram depicting the system configuration of the magnetic marker detection system in the first embodiment.

Sensor array 11 is a rod-shaped unit having fifteen magnetic sensors C1 to C15 arrayed on the straight line, as in FIG. 1, FIG. 2, and FIG. 4. The space among fifteen magnetic sensors C1 to C15 is equal 10 cm. Sensor array 11 is attached, for example, inside the front bumper of vehicle 5, as taking an attitude along the vehicle-width direction. Sensor array 11 is configured to include a combination of fifteen magnetic sensors Cn (n is an integer of 1 to 15) and signal processing circuit 110 having a CPU and so forth not depicted in the drawing incorporated therein (FIG. 4).

Magnetic sensor Cn is a sensor that detects magnetism by using the known MI effect (Magneto Impedance Effect) in which the impedance of a magneto-sensitive body such as an amorphous wire sensitively changes in response to the external magnetic field. Magnetic sensor Cn detects a magnetic component acting along the magneto-sensitive body such as a linear amorphous wire and outputs a sensor signal indicating the magnitude of that magnetic component. In magnetic sensor Cn, two linear magneto-sensitive bodies are incorporated so as to be orthogonal to each other. Magnetic sensor Cn can detect magnetic components in two directions along the respective magneto-sensitive bodies.

Magnetic sensors Cn is highly-sensitive sensors with a measurement range of magnetic flux density of ±0.6 milliteslas and a magnetic flux resolution of 0.02 microteslas in the measurement range. As described above, magnetic marker 10 can act with magnetism having a magnetic flux density equal to or larger than 8 μT in the range assumed as the attachment height of magnetic sensors Cn of 90 mm to 250 mm. With magnetic marker 10 acting magnetism equal to or more than the magnetic flux density of 8 μT, detection can be made with high certainty by using magnetic sensors Cn having the magnetic flux resolution of 0.02 μT.

Note in sensor array 11 of the present embodiment that each magnetic sensor Cn is incorporated so that the axis directions of each of the two linear magneto-sensitive bodies (amorphous wires) of each magnetic sensor Cn are identical. And, sensor array 11 is attached to vehicle 5 so that each magnetic sensor Cn can detect magnetic components acting in the forwarding direction and the vertical direction.

Signal processing circuit 110 (FIG. 4) is a circuit that performs signal processing such as noise removal or amplification on the sensor signal from each magnetic sensor Cn. Signal processing circuit 110 captures the sensor signal from each magnetic sensor Cn every time vehicle 5 proceeds a predetermined amount (for example, 5 cm), converts that signal into a magnetic measurement value, and externally outputs the value as an output signal of sensor array 11. The output signal of sensor array 11 is a signal of fifteen channels for magnetic sensors Cn, each channel indicates magnetic measurement values (magnetic measurement value in the forwarding direction and magnetic measurement value in the vertical direction).

Detection Unit)

Detection unit 12 (FIG. 4) is a circuit that performs marker detection process, which is an arithmetic process for detecting magnetic marker 10. Detection unit 12 has a circuit substrate having implemented thereon a CPU (central processing unit) that performs various arithmetic operations, memory elements such as ROM (read only memory) and RAM (random access memory), and so forth.

In a storage area of the RAM, a work area for storing time-series magnetic measurement values of each magnetic sensor Cn is formed. By using this work area, detection unit 12 stores time-series magnetic measurement values over a period of movement at a previous predetermined distance (for example, 10 m) of vehicle 5. As time-series magnetic measurement values, there are magnetic measurement values in the forwarding direction and magnetic measurement values in the vertical direction.

To detection unit 12, signal lines of a vehicle speed sensor (omitted in the drawings) included in vehicle 5 are connected. The vehicle speed sensor is a sensor that outputs a pulse signal every time the wheel rotates by a predetermined amount. As the predetermined amount, for example, a predetermined angle of 1 degree, 10 degrees, or 30 degrees, a predetermined distance of 1 cm, 5 cm, or 10 cm, and so on may be adopted. Detection unit 12 of the present embodiment controls sensor array 11 so as to be able to obtain magnetic measurement values every time vehicle 5 advances 5 cm. Note that sensor array 11 may be controlled so that magnetic measurement values can be obtained with a frequency of, for example 3 KHz.

Detection unit 12 reads magnetic measurement values of each magnetic sensor Cn stored in the work area of the RAM described above to perform marker detection process and so forth. Detection unit 12 performs marker detection process every time vehicle 5 advances (moves) 5 cm, and inputs the detection result of the marker detection process to vehicle ECU 50. The result of the marker detection process includes information as to whether any magnetic marker 10 has been detected and, if any magnetic marker 10 has been detected, a lateral shift amount with respect to that magnetic marker 10.

Detection unit 12 includes functions as circuits (means) each described below.

(a) Differential circuit 121: a circuit that obtains a magnetic differential value, which is a difference between magnetic measurement values, for each combination of two magnetic sensors spaced with a predetermined space among fifteen magnetic sensors Cn configuring sensor array 11.

(b) Arithmetic circuit 123: a circuit for performing arithmetic process, with magnetic differential values obtained by differential circuit 121 as input values. Arithmetic circuit 123 of the present embodiment performs arithmetic process for detecting the position of magnetic marker 10 in the vehicle-width direction by measuring the lateral shift amount of vehicle 5 with respect to magnetic marker 10.

(c) Setting circuit 125: a circuit for selectively setting the above-described predetermined space for obtaining magnetic differential values.

Figure 5:
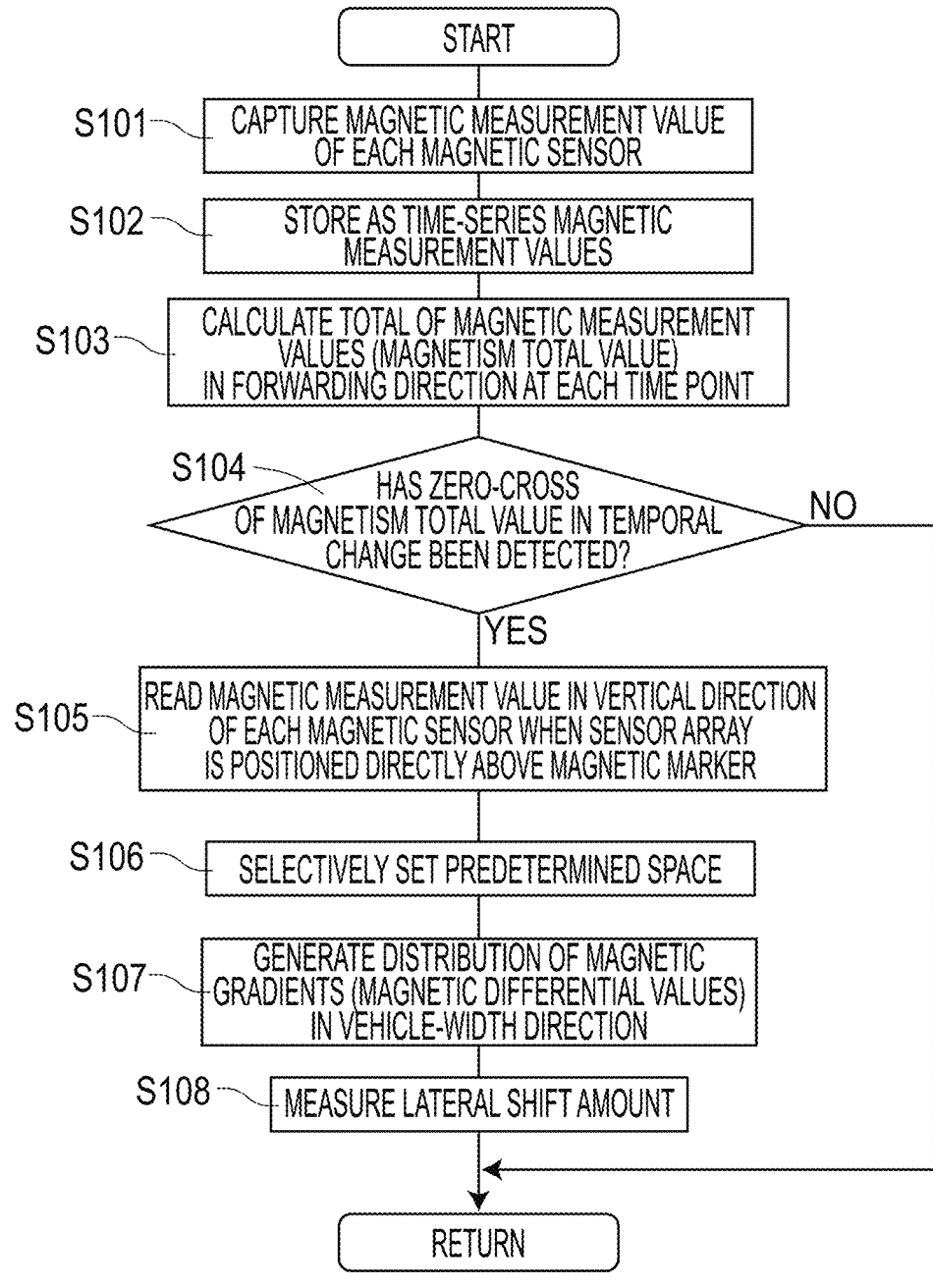
FIG. 5 is a flow diagram depicting a flow of marker detection process in the first embodiment.

A flow of marker detection process by detection system 1 configured as described above is described with reference to a flow diagram of FIG. 5. This marker detection process is a process to be performed by detection system 1 every time vehicle 5 advances 5 cm. In the following, details of the marker detection process are described by taking the operation of detection unit 12 as a subject.

Detection unit 12 captures magnetic measurement values of each magnetic sensor Cn of sensor array 11 every time vehicle 5 advances 5 cm (S101). Note that detection unit 12 detects that vehicle 5 has advanced 5 cm in response to the capture of the pulse signal by the vehicle speed sensor, and inputs a data request signal to sensor array 11. As described above, data obtained by detection unit 12 from sensor array 11 is a magnetic measurement value in the forwarding direction and a magnetic measurement value in the vertical direction of each magnetic sensor Cn.

Detection unit 12 writes the magnetic measurement values (in the forwarding direction and in the vertical direction) of each magnetic sensor Cn captured from sensor array 11 in the work area (storage area of the RAM) as occasion arises. Here, while the latest magnetic measurement values are newly stored, the oldest magnetic measurement values of the stored magnetic measurement values are erased. With this, for each magnetic sensor Cn, time-series magnetic measurement values (the forwarding direction and the vertical direction) over the previous predetermined period (in the present embodiment, a movement period corresponding to a movement distance of 10 m) are stored and retained in the work area (S102).

For the time-series magnetic measurement values in the forwarding direction of each magnetic sensor Cn when vehicle 5 passes over magnetic marker 10, detection unit 12 calculates a magnetism total value, which is a total sum of the magnetic measurement values at each time point (S103). When vehicle 5 passes over magnetic marker 10, this magnetism total value temporally changes as exemplarily depicted in FIG. 6.

Figure 6:
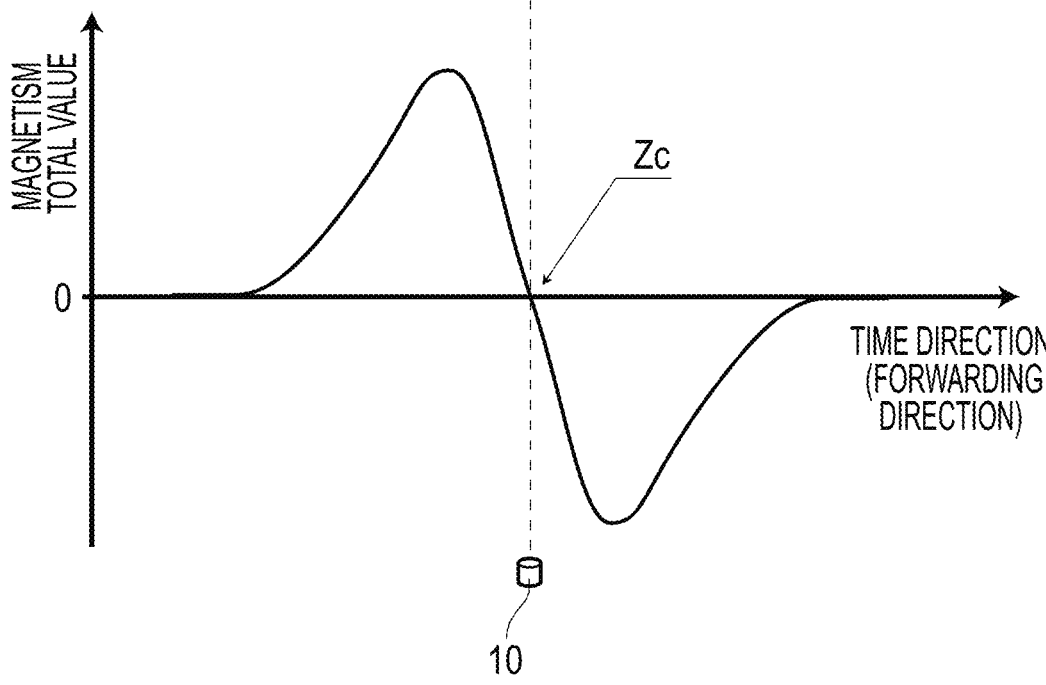
FIG. 6 is a graph depicting changes in time of a magnetic measurement value in a forwarding direction at the time of passage over the magnetic marker in the first embodiment.

The magnetism total value, which is a total sum of the magnetic measurement values in the forwarding direction at each time point, gradually increases as the vehicle approaches magnetic marker 10, that is, as time proceeds, and reaches its peak on a positive side at a position before magnetic marker 10, as in FIG. 6. When the vehicle further approaches magnetic marker 10, this magnetism total value gradually decreases, and becomes zero when magnetic sensor Cn is positioned directly above magnetic marker 10. Then, the magnetism total value gradually increases to a negative side as magnetic sensor Cn goes away from magnetic marker 10, that is, as time proceeds after passage over magnetic marker 10, and becomes at its peak on the negative side. When the vehicle further goes away from magnetic marker 10, the absolute value of this magnetism total value gradually decreases to approach zero. That is, the magnetism total value at each time point, which is a total sum of the magnetic measurement values in the forwarding direction at each time point, shows a curve as shown in FIG. 6 with two crests of positive and negative adjacent to each other across magnetic marker 10. This curve includes zero-cross Zc crossing zero with a steep gradient at a position directly above magnetic marker 10.

Detection unit 12 determines whether zero-cross Zc has been detected from a temporal change of the magnetism total value of, for example, FIG. 6 (S104). If zero-cross Zc has been detected (S104: YES), detection unit 12 determines that magnetic marker 10 has been detected. Then, detection unit 12 reads, from the work area, the magnetic measurement value in the vertical direction of each magnetic sensor Cn when sensor array 11 is positioned directly above magnetic marker 10 (S105).

Figure 7:
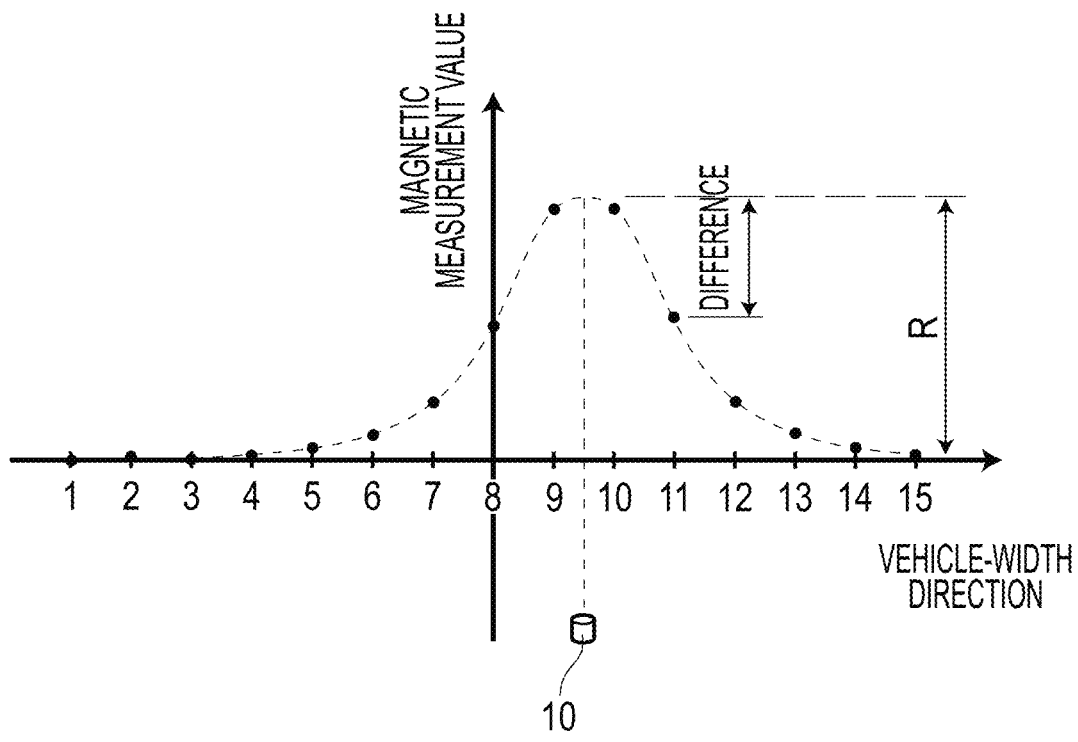
FIG. 7 is a graph depicting a distribution of magnetic measurement values in a vertical direction by each magnetic sensor when a sensor array is positioned directly above the magnetic marker in the first embodiment.

When sensor array 11 is positioned directly above magnetic marker 10, the distribution of magnetic measurement values in the vertical direction of each magnetic sensor Cn is, for example, a distribution depicted in FIG. 7. The magnetic measurement values of each magnetic sensor Cn are distributed along a curve close to a normal distribution indicated by a broken line in the drawing. A peak of the curve indicated by the broken line appears so as to correspond to the position of magnetic marker 10. The drawing is an example when magnetic marker 10 is positioned approximately in the middle between magnetic sensor C9 and magnetic sensor C10. Note that the lateral axis in FIG. 7 and FIG. 8 to FIG. 11 described further below represents the vehicle-width direction and scales of 1 to 15 indicate the positions of magnetic sensors C1 to C15.

Detection unit 12 (setting circuit 125) selectively sets a space (predetermined space) between two magnetic sensors for calculating a magnetic gradient (magnetic differential value) in the vehicle-width direction by a method described further below (S106). Then, detection unit 12 calculates the magnetic differential value, which is a difference between magnetic measurement values in the vertical direction by two magnetic sensors spaced with the space set at step S106 (differential process), thereby generating a distribution of magnetic gradients in the vehicle-width direction (S107).

Figure 8:
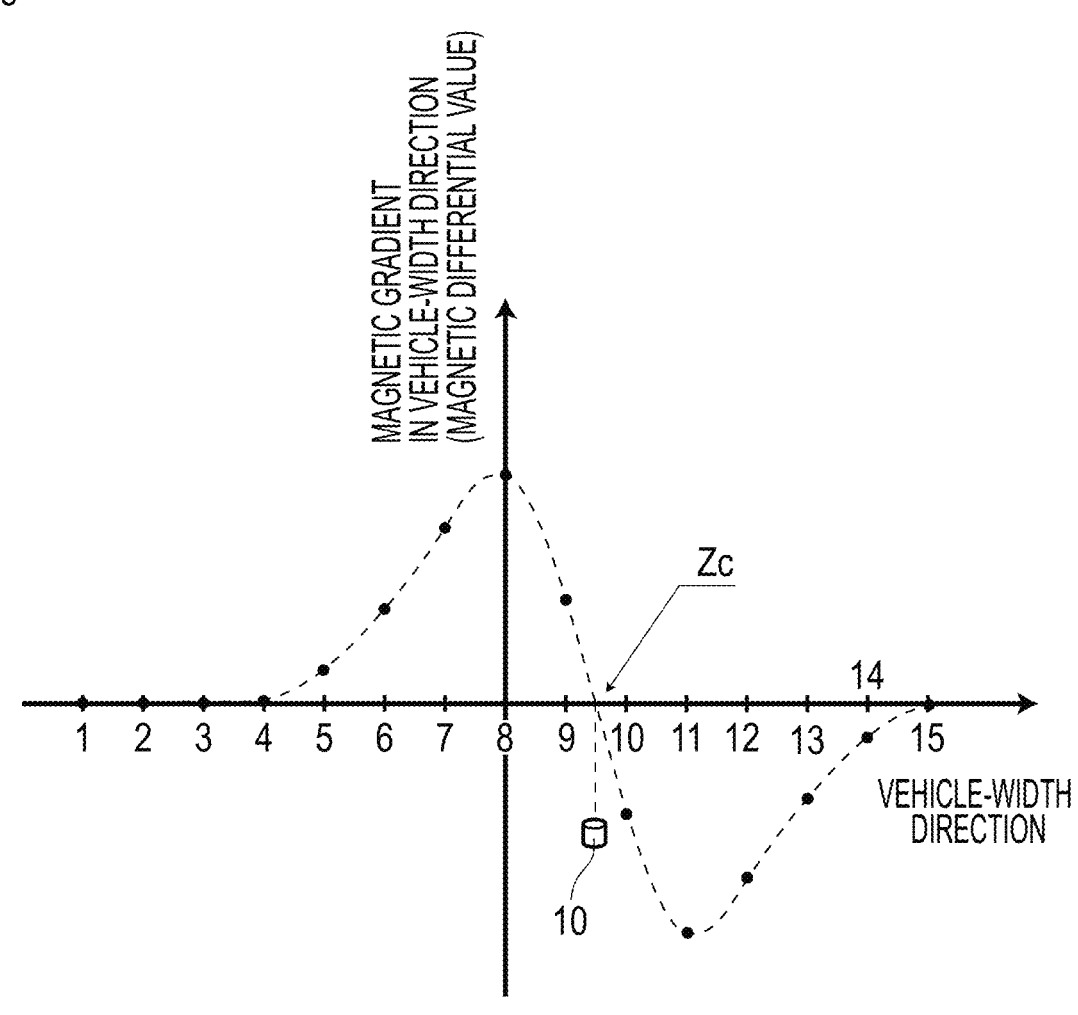
FIG. 8 is a graph depicting a distribution of magnetic gradients (magnetic differential value) in a vehicle-width direction when the sensor array is positioned directly above the magnetic marker in the first embodiment.

The distribution in the vehicle-width direction of magnetic gradients in the vehicle-width direction is, for example, a distribution depicted in FIG. 8. The magnetic gradients in the vehicle-width direction are distributed along a curve as indicted by a broken line in the drawing, with positive and negative crests being adjacent to each other. In this curve, switching is made between a positive magnetic differential value indicating a magnetism-increasing gradient and a negative magnetic differential value indicating a magnetism-decreasing gradient, in accordance with on which side the magnetic sensor is with respect to magnetic marker 10. And, in this curve, zero-cross Zc, where the sign of the magnetic differential value is reversed, occurs so as to correspond to the position of magnetic marker 10.

Detection unit 12 calculates an approximate curve (for example, the curve indicated by the broken line in FIG. 8) of the distribution of magnetic gradients (magnetism differential values) in the vehicle-width direction and identifies zero-cross Zc, thereby identifying the position of magnetic marker 10 in the vehicle-width direction. The position of magnetic marker 10 in the vehicle-width direction can be identified as a position corresponding to zero-cross Zc of the approximate curve.

Detection unit 12 measures a deviation of the center position of sensor array 11 (in the present embodiment, the position of magnetic sensor C8) in the vehicle-width direction with respect to magnetic marker 10 as the lateral shift amount of vehicle 5 (S108). For example, in the case of FIG. 8, zero-cross Zc of the approximate curve is positioned near C9.5, approximately in the middle between C9 and C10. Since the space between magnetic sensors C9 and C10 is 10 cm, the lateral shift amount of vehicle 5 with respect to magnetic marker 10 is $(9.5-8) \times 10$ cm=15 cm with reference to C8 positioned at the center of sensor array 11 in the vehicle-width direction.

Upon detecting magnetic marker 10 and measuring the lateral shift amount in a manner as described above, detection unit 12 outputs the detection results including the fact that magnetic marker 10 has been detected and the lateral shift amount. Note that vehicle ECU 50 achieves driving assist control such as lane keeping traveling by using the detection results outputted from detection unit 12.

Figure 9:
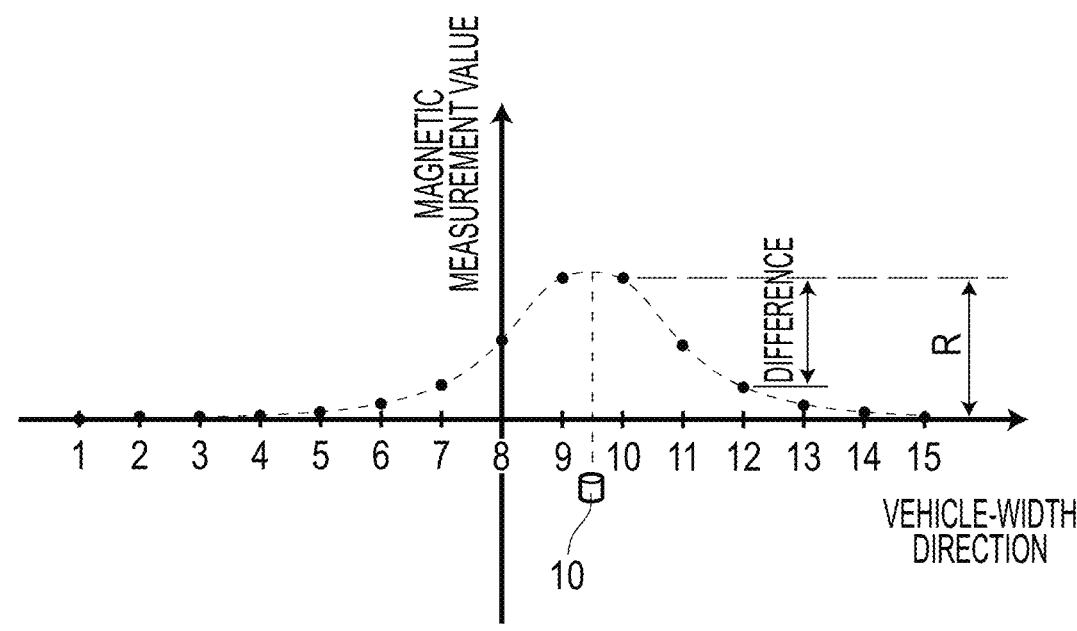
FIG. 9 is another graph depicting a distribution of magnetic measurement values in the vertical direction by each magnetic sensor when the sensor array is positioned directly above the magnetic marker in the first embodiment.
Figure 10:
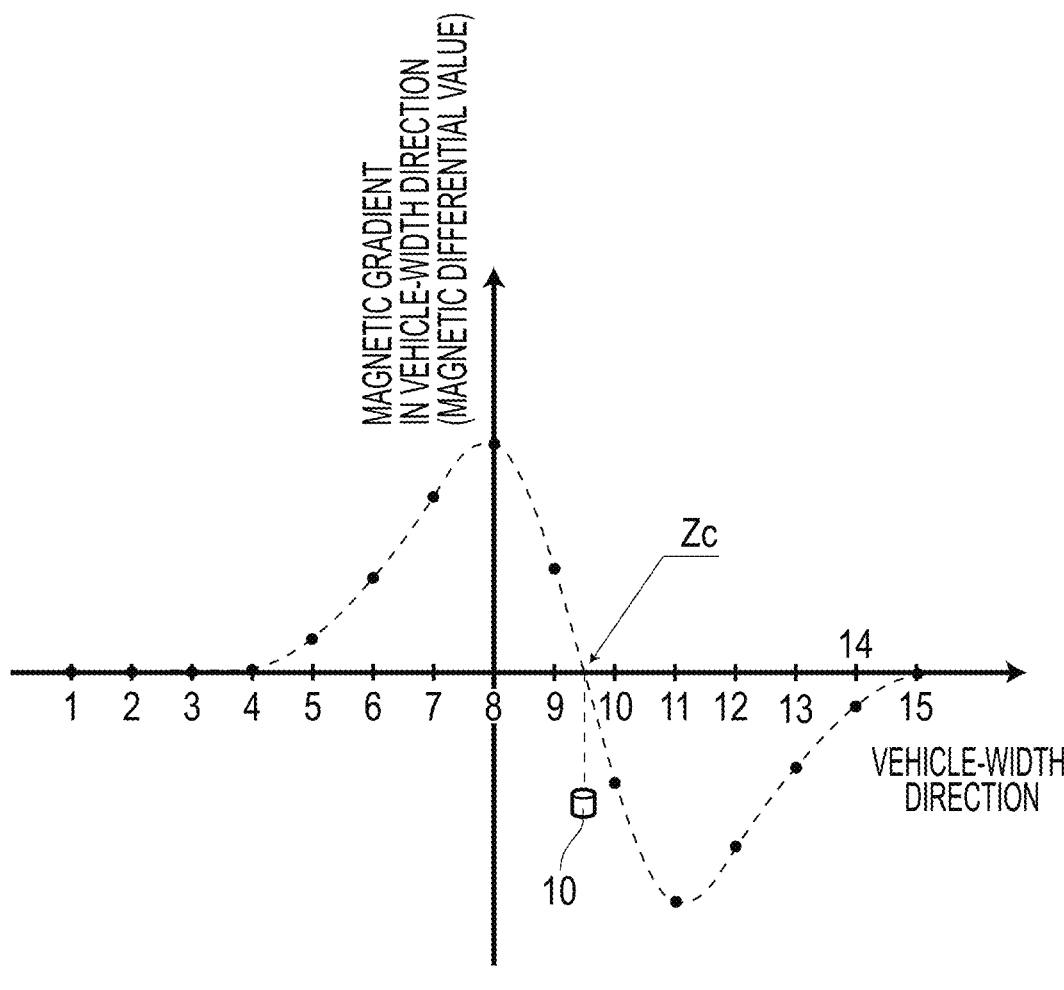
FIG. 10 is another graph depicting a distribution of magnetic gradients (magnetic differential value) in the vehicle-width direction when the sensor array is positioned directly above the magnetic marker in the first embodiment.

Next, the method of setting process (S106 in FIG. 5) by setting circuit 125 selectively setting the above-described predetermined space at the time of calculating the magnetic gradient in the vehicle-width direction is described with reference to FIG. 7 to FIG. 10. Here, a distribution of FIG. 9 corresponds to the distribution of FIG. 7. Between the distribution of FIG. 9 and the distribution of FIG. 7, the attachment height of sensor array 11 varies. The distribution of FIG. 9 is the distribution when the attachment height of sensor array 11 is higher than that of FIG. 7. The relation between FIG. 9 and FIG. 10 is similar to the relation between FIG. 7 and FIG. 8. FIG. 10 depicts a distribution of magnetic differential values, which are magnetic gradients in the vehicle-width direction based on the magnetic measurement values of FIG. 9.

Setting circuit 125 identifies a numerical range R of magnetic measurement values of each magnetic sensor Cn when sensor array 11 is positioned directly above magnetic marker 10 (refer to FIG. 7 and FIG. 9). Specifically, setting circuit 125 identifies a maximum value and a minimum value of the magnetic measurement value and subtracts the minimum value from the maximum value, thereby identifying the numerical range R of the magnetic measurement value.

Setting circuit 125 sets a narrower space (predetermined space) between two magnetic sensors Cn for obtaining the magnetic gradient in the vehicle-width direction as the numerical range R of the magnetic measurement value is larger (for example, FIG. 7). Also, it sets a wider space between two magnetic sensors Cn as the numerical range R of the magnetic measurement value is smaller (for example, FIG. 9). In the present embodiment, with reference to a numerical range R@90 (simulation arithmetic value) with 90 mm, which is a lower limit of the range of the attachment height of sensor array 11, the predetermined space for obtaining the magnetic gradient in the vehicle-width direction is set as follows.

(1) When the numerical range R of the magnetic measurement value is equal to or larger than R@90×80%.

The predetermined space is set at 10 cm, which is the space between two magnetic markers adjacent to each other.

(2) When the numerical range R of the magnetic measurement value is equal to or larger than R@90×50% and smaller than R@90×80%.

The predetermined space is set at 20 cm, which is the space between two magnetic markers adjacent to each other with one magnetic marker interposed therebetween.

(3) When the numerical range R of the magnetic measurement value is smaller than R@90×50%.

The predetermined space is set at 30 cm, which is the space between two magnetic markers adjacent to each other with two magnetic markers interposed therebetween.

For example, as for the distribution of magnetic measurement values of FIG. 7, the numerical range R of the magnetic measurement value is on the order of 90% of R@90, and this corresponds to the above-described case (1). In this case, 10 cm is set as the predetermined space, the difference between magnetic measurement values of two magnetic sensors adjacent to each other in sensor array 11 is obtained (refer to FIG. 7), and the magnetic gradient (magnetic differential value) in the vehicle-width direction is calculated (refer to FIG. 8).

On the other hand, for example, as for the distribution of magnetic measurement values of FIG. 9, the numerical range R of the magnetic measurement value is on the order of 60% of R@90, and this corresponds to the above-described case (2). In this case, 20 cm is set as the predetermined space, the difference between magnetic measurement values of two magnetic sensors adjacent to each other with one magnetic sensor interposed therebetween in sensor array 11 is obtained (refer to FIG. 9), and the magnetic gradient (magnetic differential value) in the vehicle-width direction is calculated (refer to FIG. 10).

When a comparison is made between the distribution of magnetic measurement values of FIG. 7 and the distribution of magnetic measurement values of FIG. 9, the magnetic measurement values of the distribution of FIG. 7 with the low attachment height of sensor array 11 are larger, and the height of the crest of the approximate curve is higher. On the other hand, when a comparison is made between the distribution of magnetic differential values, which are magnetic gradients in the vehicle-width direction, of FIG. 8 and the distribution of magnetic differential values, which are magnetic gradients in the vehicle-width direction, of FIG. 10, there is no big difference in amplitude of the approximate curve. The reason for this is that the predetermined space when the magnetic differential value is obtained is selectively set in accordance with the magnitude of the magnetic measurement value, thereby suppressing the degree of influence of the difference in magnitude of the magnetic measurement value of each magnetic sensor Cn on the magnetic differential values (differences in FIG. 7 and FIG. 9).

Here, to ensure accuracy of the process of measuring the lateral shift amount with respect to magnetic marker 10 as described above by using the magnetic gradients in the vehicle-width direction (for example, magnetic differential values of FIG. 8 and FIG. 10), it is important to be able to ensure some magnitude of the magnetic differential value forming the magnetic gradient in the vehicle-width direction. By setting the space between two magnetic sensors for obtaining the magnetic differential value as described above, it is possible to ensure the magnitude of the magnetic differential value, which is the magnetic gradient in the vehicle-width direction, even if the attachment height of sensor array 11 is low and the crest of the change curve of the magnetic measurement values of each magnetic sensor Cn is low and small (refer to FIG. 9).

Also, similar distributions of magnetic gradients (magnetic differential values) in the vehicle-width direction are effective in enhancing uniformity in the process for measuring the lateral shift amount by using the magnetic gradient in the vehicle-width direction as described above. By improving uniformity in the process for measuring the lateral shift amount, it is possible to measure the lateral shift amount with high accuracy, irrespective of the difference in attachment height of sensor array 11.

As described above, detection system 1 of the present embodiment for processing the magnetic measurement value by each magnetic sensor Cn of sensor array 11 attached to vehicle 5 has one technical feature in which the space between two magnetic sensors for obtaining the difference forming the magnetic gradient in the vehicle-width direction is selectively set.

By selectively setting the space between two magnetic sensors for obtaining the difference, it is possible to suppress the influence due to the magnitude of the magnetic measurement values occurring due to the variance in attachment height of sensor array 11 (magnetic sensors). And, if the influence due to the variance in attachment height of sensor array 11 can be suppressed, it is possible to make the specifications of the process of handling the magnetic measurement values of the magnetic sensors almost common, irrespective of the variance in attachment height of the sensor array, and accuracy in detecting magnetic marker 10 can be improved.

The present embodiment is an example in which 10 cm, which is the space between magnetic sensors adjacent to each other in the width direction in sensor array 11, is set as the predetermined space for calculating a difference. And, in the present embodiment, as a combination of two positions spaced with the predetermined space, a combination of positions of two magnetic sensors adjacent to each other in sensor array 11 is set, and the difference between magnetic measurement values of the adjacent magnetic sensors is calculated. The magnetic measurement values of magnetic sensors are values configuring the distribution of magnetic measurement values of the magnetic sensors. Note that, in place of the configuration of the present embodiment, a space between two magnetic sensors spaced with one magnetic sensor interposed therebetween or a space between two magnetic sensors spaced with a plurality of any two or more magnetic sensors interposed therebetween may be set as the predetermined space.

In place of the configuration of the present embodiment, a magnetic gradient in the forwarding direction may be calculated by a temporal difference between time-series magnetic measurement values in the vertical direction. In the present embodiment, a magnetic measurement is performed ever time vehicle 5 advances 5 cm. Therefore, the time-series magnetic measurement values in the vertical direction are values at respective positions with every 5 cm in the forwarding direction. To calculate a magnetic gradient (magnetic differential value) in the forwarding direction by the temporal difference, it is preferable to selectively set 5 cm, which is a space corresponding to two time points temporally adjacent to each other, 10 cm, which is a space corresponding to two time points adjacent to each other with one time point interposed therebetween, or the like as the predetermine space to calculate the magnetic differential value.

Note in the present embodiment that, as one example of arithmetic process with the difference between magnetic measurement values as an input value, the process of measuring the lateral shift amount of vehicle 5 with respect to magnetic marker 10, that is, the process for detecting the relative position of magnetic marker 10 in the vehicle-width direction (with respect to vehicle 5), is exemplarily described. As described above, magnetic marker 10 may be detected by taking the temporal difference (magnetic gradient in the forwarding direction) between magnetic measurement values in the vertical direction as an input value. Detecting magnetic marker 10 by using the magnetic gradient in the forwarding direction corresponds to detecting that vehicle 5 has reached magnetic marker 10, that is, the relative position of magnetic marker 10 in the forwarding direction (with respect to vehicle 5) is zero.

Note that the arithmetic process for detecting a magnetic marker may be a filter process for eliminating magnetic components of uniformly-acting external disturbance such as, for example, the magnetism of the earth. When a difference between magnetic measurement values is calculated as this filter process, the technical idea of the present embodiment may be applied. In this case, it is possible to enhance uniformity of the specifications of the filter process to make the filter characteristics almost uniform, irrespective of variations in attachment height of the magnetic sensors, and certainty in detecting a magnetic marker can be improved.

Second Embodiment

The present embodiment is an example in which, based on the configuration of the first embodiment, the method of setting the space between two magnetic sensors when obtaining a difference between magnetic measurement values is changed.

(First Setting Method)

A first setting method is a setting method of changing the space between two magnetic sensors to obtain the magnetic differential value, which is the magnetic gradient in the vehicle-width direction, in accordance with the attachment height of sensor array 11. The range of the attachment height of sensor array 11 is 90 mm to 250 mm in accordance with the vehicle type. In the first setting method, this range is divided into three stages, and the predetermined space is set for each division. Note that the attachment height of sensor array 11 may be stored in advance as an attachment specification or may be measured by an ultrasonic sensor or the like. With a measurement by a sensor, it is possible to suitably support even a change in vehicle height by the weight of baggage to be loaded on the vehicle, many onboard people, or the like.

(1) First Division

The first division is a division with an attachment height equal to or larger than 90 mm and smaller than 150 mm. The predetermined space corresponding to the first division is 10 cm, which is the space between two magnetic sensors adjacent to each other in sensor array 11.

(2) Second Division

The second division is a division with an attachment height equal to or larger than 150 mm and smaller than 200 mm. The predetermined space corresponding to the second division is 20 cm, which is the space between two magnetic sensors adjacent to each other with one magnetic sensor interposed therebetween in sensor array 11.

(3) Third Division

The third division is a division with an attachment height equal to or larger than 200 mm and equal to or smaller than 250 mm. The predetermined space corresponding to the third division is 30 cm, which is the space between two magnetic sensors adjacent to each other with two magnetic sensors interposed therebetween in sensor array 11.

(Second Setting Method)

A second setting method is a process of setting the predetermined space, which is the space between two magnetic sensors, so that the magnitude of the numerical range of magnetic differential values obtained for each combination of two magnetic sensors when sensor array 11 is positioned directly above magnetic marker 10 is made closer to a predetermined value.

In this method, a distribution of magnetic differential values (magnetic gradients in the vehicle-width direction) for each combination of two magnetic sensors adjacent to each other in sensor array 11, a distribution of magnetic differential values for each combination of two magnetic sensors adjacent to each other with one magnetic sensor interposed therebetween, and a distribution of magnetic differential values for each combination of two magnetic sensors adjacent to each other with two magnetic sensors interposed therebetween are each obtained.

In the second setting method, a reference value regarding the maximum value of the magnetic differential value is set. And, in this setting method, among the above-described three types of distributions of magnetic differential values, the distribution in which the maximum value of the magnetic differential value is most closed to the reference value is selected and used for the process of measuring the lateral shift amount and so forth.

Note that the other configurations and the operation and effects are similar to those in the first embodiment.

Third Embodiment

The present embodiment is an example in which, based on the first embodiment, the method of obtaining the difference, which is the magnetic gradient in the vehicle-width direction, is changed. Details of this are described with reference to FIG. 11.

Figure 11:
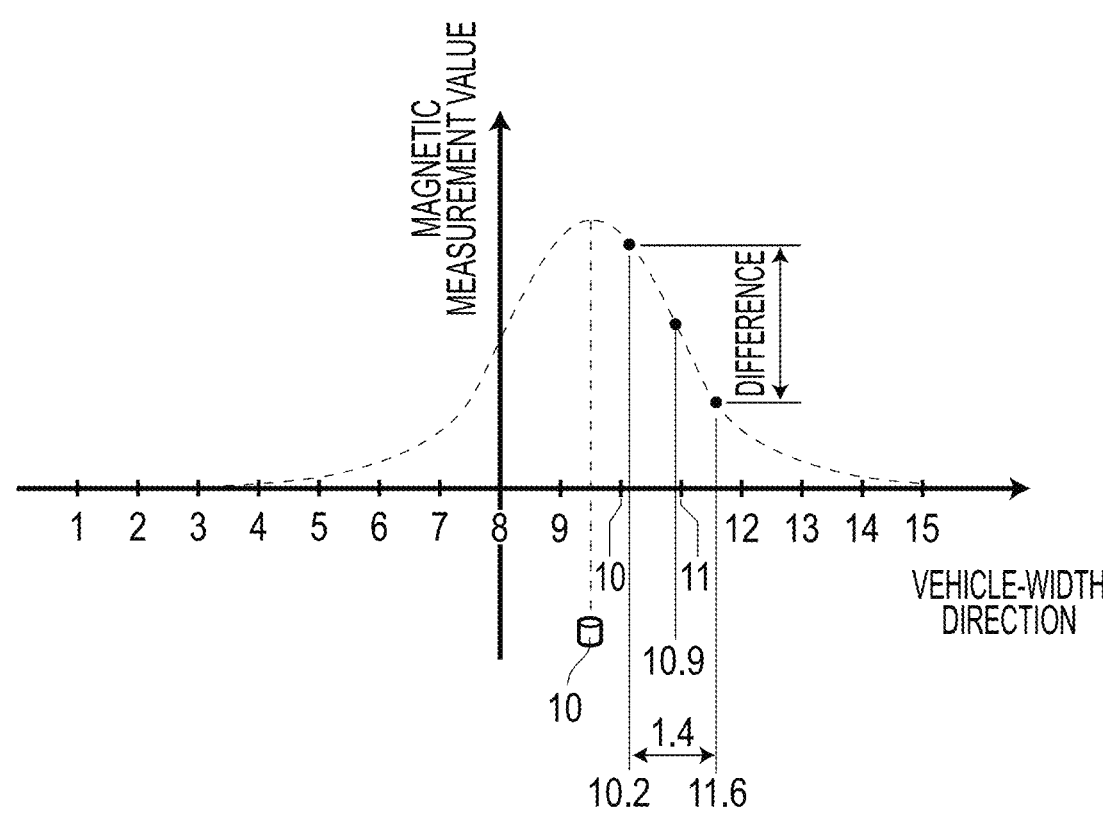
FIG. 11 is a descriptive diagram of a method of setting a space between two magnetic markers in a third embodiment.

In the present embodiment, the distribution of magnetic measurement values of each magnetic sensor in the sensor array is replaced by an approximate curve (curve indicated by a broken line in FIG. 11). And, in the present embodiment, to obtain the magnetic differential value, which is the magnetic gradient in the vehicle-width direction, the predetermined space, which is the space between two magnetic sensors, is selectively set from among stepless spaces. In the present embodiment, it is assumed that the approximate curve of the distribution of magnetic measurement values is configured of magnetic measurement values by an infinite number of magnetic sensors.

And, at a point where the gradient of the approximate curve of the distribution of magnetic measurement values is largest, the space between two positions is selected so that the difference between the two positions has a predetermined value. For example, when exemplarily described as FIG. 11, with reference to the position where the gradient is maximum (for example, a position of 10.9 on the lateral axis in the drawing), these two positions are two positions equidistantly away from that position (for example, a position of 10.2 and a position of 11.6 in the drawing). And, the predetermined range is 1.4 obtained by subtracting 10.2 from 11.6. In the present embodiment, as for the approximate curve of the distribution of magnetic measurement values (refer to FIG. 11), the difference between magnetic measurement values is obtained for each combination of two positions forming the space selected as described above (in the case of FIG. 11, a range of 1.4).

In the present embodiment, the approximate curve is exemplarily described as one example of a line representing a distribution of magnetic measurement values. The line representing the distribution may be a line linearly connecting two values adjacent to each other among magnetic measurement values configuring the distribution.

Note that the other configurations and the operation and effects are similar to those in the first embodiment.

Fourth Embodiment

The present embodiment is an example in which, based on the first embodiment, a sensor array is adopted in which the space between magnetic sensors adjacent to each other can be changed. Details of this are described with reference to FIG. 12 and FIG. 13.

Figure 12:
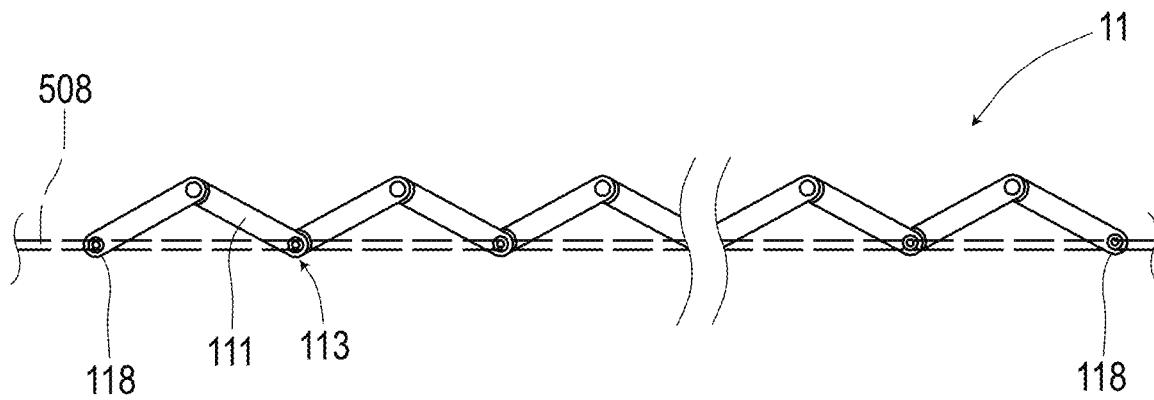
FIG. 12 is a descriptive diagram depicting a sensor array in a fourth embodiment.
Figure 13:
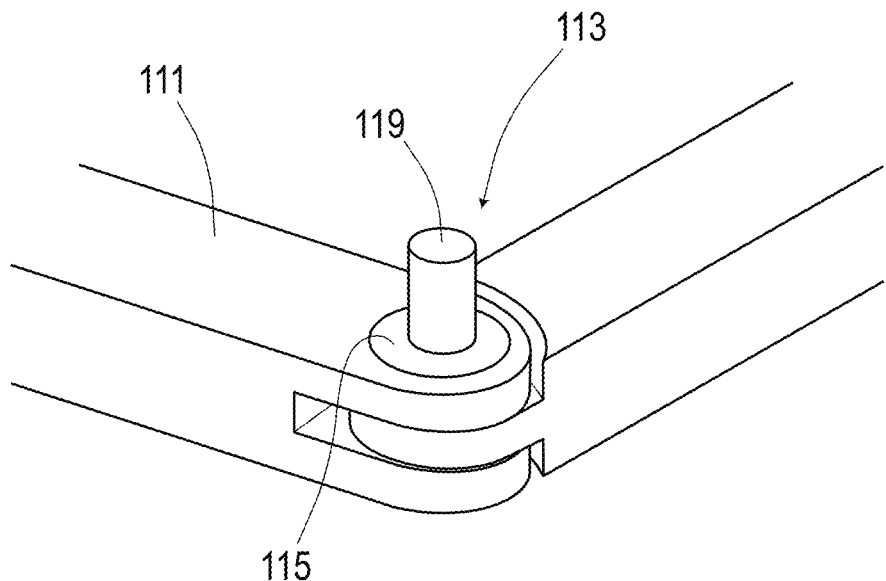
FIG. 13 is an enlarged view of a joint portion of the sensor array in the fourth embodiment.

Sensor array 11 of the present embodiment includes a multiarticular structure with twenty-eight links 111 are connected in series with joints 113 at twenty-seven locations, as in FIG. 12. Link 111 is a rod-shaped member having a rectangular section, and is provided with a hole at each of both ends, through which joint pin 115 (FIG. 13) is arranged to penetrate. Each joint 113 is formed by connecting two links 111 with joint pin 115. Note that link ends 118 positioned at end portions of sensor array 11 are each provided also with a hole, through which dummy joint pin 115 is arranged to penetrate.

In sensor array 11, sliding pin 119 is provided coaxially and extendedly at each of joint pins 115 at two locations at both ends each forming link end 118 and even-numbered joint pins 115 at thirteen locations counted from link ends 118. Also, at each of joint pins 115 at these fifteen locations, the magnetic sensor (omitted in the drawing) is arranged at another end opposite to sliding pin 119. The sensor array 11 is attached to the vehicle in a state of being hung down, with sliding pins 119 retained in linear rail groove 508 attached to, for example, the bottom surface of the vehicle.

Each joint 113 is provided with a pressing member (omitted in the drawing) that presses so as to narrow an angle formed by links 111 on both sides. The pressing force of each joint 113 is equal. Therefore, when sensor array 11 is pulled from both sides, the angle formed by links 111 at each joint 113 is uniform. With this, the space between adjacent joints 113 is uniform, and sensor array 11 exhibits an equally serrated wave form as a whole. Sensor array 11 is attached to the vehicle in a state in which twenty-eight links 111 exhibit this equally serrated wave form.

In sensor array 11 in the state of being hung down from the bottom surface of the vehicle as described above, fifteen magnetic sensors arranged at link ends 118 at two locations at both ends and even-numbered joints 113 at thirteen locations counted from link ends 118 face the road surface. As described above, magnetic sensors are each arranged at joint pin 115 retained so as to be able to advance and retreat in linear rail groove 508, and are arrayed on a straight line along this rail groove 508. Furthermore, as described above, since respective links 111 of sensor array 11 exhibit the equally serrated wave form, the space between joint pins 115 where magnetic sensors are arranged is uniform. Thus, the magnetic sensors included in sensor array 11 are equidistantly arrayed along a straight line.

To attach sensor array 11 of the present embodiment to a vehicle, sensor array 11 is preferably extended as appropriate so that the space between magnetic sensors is appropriate in accordance with the attachment height of sensor array 11. This sensor array 11 can be applied to both of a vehicle in which the attachment height of sensor array 11 is low and the space between magnetic sensors is preferably narrow and a vehicle in which the attachment height of sensor array 11 is high and the space between magnetic sensors is preferably wide. In this sensor array 11, when the magnetic gradient in the vehicle-width direction based on the magnetic measurement values of each magnetic sensor is calculated, it is only required that the difference between magnetic measurement values of adjacent two magnetic sensors be calculated.

In place of the present embodiment, for example, a plurality of magnetic sensors may be retained along the axial direction of the center axis of a cylindrical coiled spring. In this case, by extending the coiled spring as appropriate, it is possible to adjust the space between magnetic sensors. In place of the coiled spring, a strip-shaped elastic member may be used. Note that in place of the cylindrical coiled spring, a columnar-shaped elastic member may be adopted.

Note that the other configurations and the operation and effects are similar to those in the first embodiment.

In the foregoing, while specific examples of the present invention are described in detail as in the embodiments, these specific examples merely disclose examples of technology included in the scope of the claims. Needless to say, the scope of the claims should not be restrictively construed based on the configuration, numerical values, and so forth of the specific examples. The scope of the claims includes techniques acquired by variously modifying, changing, or combining as appropriate the above-described specific examples by using known techniques, knowledge of a person skilled in the art, and so forth.

REFERENCE SIGNS LIST

1 detection system
10 magnetic marker
11 sensor array
12 detection unit
121 differential circuit
123 arithmetic circuit
125 setting circuit
Cn magnetic sensor
5 vehicle
5S driving assist system
50 vehicle ECU

The invention claimed is:

1. A magnetic marker detection method for a vehicle including a sensor array with a plurality of magnetic sensors that obtain magnetic measurement values arrayed in a width direction to detect a magnetic marker laid in a traveling road, the magnetic marker detection method comprising:

a differential process of obtaining, based on a distribution of the magnetic measurement values of the plurality of magnetic sensors configuring the sensor array, for each combination of two positions spaced with a predetermined space, a difference between values configuring the distribution or values configuring a line representing the distribution;

an arithmetic process for detecting the magnetic marker or for detecting a position of the magnetic marker by taking the difference for the each combination obtained by the differential process as an input value; and a setting process of selectively setting the predetermined space for obtaining the difference, wherein the setting process can be performed during traveling of the vehicle, and the predetermined space can be changed by the setting process during the traveling of the vehicle.

2. The magnetic marker detection method in claim 1, wherein the setting process changes the predetermined space in accordance with a numerical range of the magnetic measurement values of the plurality of magnetic sensors when the sensor array is positioned directly above the magnetic marker, narrowing the predetermined space as the numerical range of the magnetic measurement values is larger and widening the predetermined space as the numerical range of the magnetic measurement values is smaller.

3. The magnetic marker detection method in claim 2, wherein the plurality of magnetic sensors are equidistantly arranged in the sensor array and a space between two magnetic sensors adjacent to each other is fixed, the setting process selects any of the space between the two magnetic sensors adjacent to each other, a space between two magnetic sensors spaced with one magnetic sensor interposed therebetween, a space between two magnetic sensors spaced with a plurality of any two or more magnetic sensors interposed therebetween and sets the space as the predetermined space, and in the differential process, the difference between the values is obtained for the each combination of the two magnetic sensors located at the two positions.

4. The magnetic marker detection method in claim 2, wherein the sensor array is configured in which while the plurality of magnetic sensors are equidistantly arranged, and a space between two magnetic sensors adjacent to each other can be changed, the setting process is a process of setting the predetermined space by changing the space between the two magnetic sensors adjacent to each other in the sensor array, and in the differential process, the difference between the values is obtained for the each combination of the two magnetic sensors adjacent to each other located at the two positions.

5. The magnetic marker detection method in claim 2, wherein the line representing the distribution is an approximate curve of the distribution, and the two positions are positions on the approximate curve.

6. The magnetic marker detection method in claim 1, further comprising a process of measuring a ground height of the sensor array, wherein the setting process changes the predetermined space in accordance with a measurement value of the ground height of the sensor array, narrowing the predetermined space as the ground height indicated by the measurement value is lower and widening the predetermined space as the ground height indicated by the measurement value is higher.

7. The magnetic marker detection method in claim 6, wherein the plurality of magnetic sensors are equidistantly arranged in the sensor array and a space between two magnetic sensors adjacent to each other is fixed, the setting process selects any of the space between the two magnetic sensors adjacent to each other, a space between two magnetic sensors spaced with one magnetic sensor interposed therebetween, a space between two magnetic sensors spaced with a plurality of any two or more magnetic sensors interposed therebetween and sets the space as the predetermined space, and in the differential process, the difference between the values is obtained for the each combination of the two magnetic sensors located at the two positions.

8. The magnetic marker detection method in claim 6, wherein the sensor array is configured in which while the plurality of magnetic sensors are equidistantly arranged, and a space between two magnetic sensors adjacent to each other can be changed, the setting process is a process of setting the predetermined space by changing the space between the two magnetic sensors adjacent to each other in the sensor array, and in the differential process, the difference between the values is obtained for the each combination of the two magnetic sensors adjacent to each other located at the two positions.

9. The magnetic marker detection method in claim 6, wherein the line representing the distribution is an approximate curve of the distribution, and the two positions are positions on the approximate curve.

10. The magnetic marker detection method in claim 1, wherein the setting process changes the predetermined space in accordance with a numerical range of the difference for the each combination when the sensor array is positioned directly above the magnetic marker, changing the predetermined space so that a magnitude of the numerical range of the difference is made closer to a predetermined value.

11. The magnetic marker detection method in claim 10, wherein the plurality of magnetic sensors are equidistantly arranged in the sensor array and a space between two magnetic sensors adjacent to each other is fixed, the setting process selects any of the space between the two magnetic sensors adjacent to each other, a space between two magnetic sensors spaced with one magnetic sensor interposed therebetween, a space between two magnetic sensors spaced with a plurality of any two or more magnetic sensors interposed therebetween and sets the space as the predetermined space, and in the differential process, the difference between the values is obtained for the each combination of the two magnetic sensors located at the two positions.

12. The magnetic marker detection method in claim 10, wherein the sensor array is configured in which while the plurality of magnetic sensors are equidistantly arranged, and a space between two magnetic sensors adjacent to each other can be changed, the setting process is a process of setting the predetermined space by changing the space between the two magnetic sensors adjacent to each other in the sensor array, and in the differential process, the difference between the values is obtained for the each combination of the two magnetic sensors adjacent to each other located at the two positions.

13. The magnetic marker detection method in claim 1, wherein the plurality of magnetic sensors are equidistantly arranged in the sensor array and a space between two magnetic sensors adjacent to each other is fixed, the setting process selects any of the space between the two magnetic sensors adjacent to each other, a space between two magnetic sensors spaced with one magnetic sensor interposed therebetween, a space between two magnetic sensors spaced with a plurality of any two or more magnetic sensors interposed therebetween and sets the space as the predetermined space, and in the differential process, the difference between the values is obtained for the each combination of the two magnetic sensors located at the two positions.

14. The magnetic marker detection method in claim 1, wherein the sensor array is configured in which while the plurality of magnetic sensors are equidistantly arranged, and a space between two magnetic sensors adjacent to each other can be changed, the setting process is a process of setting the predetermined space by changing the space between the two magnetic sensors adjacent to each other in the sensor array, and in the differential process, the difference between the values is obtained for the each combination of the two magnetic sensors adjacent to each other located at the two positions.

15. The magnetic marker detection method in claim 14, wherein the sensor array retains the plurality of magnetic sensors so that a state in which the plurality of magnetic sensors are equidistantly arranged is maintained, and has a member acting with a pressing force for narrowing the space between the two magnetic sensors adjacent to each other, and the space between the two magnetic sensors adjacent to each other is adjusted by extending the sensor array in the width direction against the pressing force.

16. The magnetic marker detection method in claim 1, wherein the line representing the distribution is an approximate curve of the distribution, and the two positions are positions on the approximate curve.

17. A magnetic marker detection system for a vehicle including a sensor array with a plurality of magnetic sensors that obtain magnetic measurement values arrayed in a width direction to detect a magnetic marker laid in a traveling road, the magnetic marker detection system comprising:

a differential circuit that obtains, based on a distribution of the magnetic measurement values of the plurality of magnetic sensors configuring the sensor array, for each combination of two positions spaced with a predetermined space, a difference between values configuring the distribution or values configuring a line representing the distribution;

an arithmetic circuit that performs an arithmetic process for detecting the magnetic marker or for detecting a position of the magnetic marker by taking the difference for the each combination obtained by the differential circuit as an input value; and a setting circuit that selectively sets the predetermined space for obtaining the difference, wherein the setting circuit is configured to be able to selectively set the predetermined space during the traveling of the vehicle.

18. The magnetic marker detection system in claim 17, including a circuit that identifies a numerical range of magnetic measurement values of the plurality of magnetic sensors when the sensor array is positioned directly above the magnetic marker in accordance with the traveling of the vehicle, wherein the setting circuit is configured to change the predetermined space in accordance with the numerical range of the magnetic measurement values of the plurality of magnetic sensors when the sensor array is positioned directly above the magnetic marker, narrowing the predetermined space as the numerical range of the magnetic measurement values is larger and widening the predetermined space as the numerical range of the magnetic measurement values is smaller.

19. The magnetic marker detection system in claim 17, including a sensor that measures a ground height of the sensor array, wherein the setting circuit is configured to change the predetermined space in accordance with a measurement value of the ground height of the sensor array, narrowing the predetermined space as the ground height indicated by the measurement value is lower and widening the predetermined space as the ground height indicated by the measurement value is higher.

20. The magnetic marker detection system in claim 17, including a circuit that obtains a magnitude of a numerical range of the difference for the each combination when the sensor array is positioned directly above the magnetic marker in accordance with the traveling of the vehicle, wherein the setting circuit is configured to change the predetermined space in accordance with the numerical range of the difference for the each combination when the sensor array is positioned directly above the magnetic marker, setting the predetermined space so that the magnitude of the numerical range of the difference is made closer to a predetermined value.

* * * * *